US008782809B2

(12) United States Patent
Baset et al.

(10) Patent No.: US 8,782,809 B2
(45) Date of Patent: Jul. 15, 2014

(54) LIMITING INFORMATION LEAKAGE AND PIRACY DUE TO VIRTUAL MACHINE CLONING

(71) Applicant: International Business Machines Corporation, Armonk, NY (US)

(72) Inventors: Salman A. Baset, New York, NY (US); Ashish Kundu, Elmsford, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/673,358

(22) Filed: Nov. 9, 2012

(65) Prior Publication Data

US 2014/0137272 A1     May 15, 2014

(51) Int. Cl.
*G06F 21/62* (2013.01)

(52) U.S. Cl.
USPC .................. 726/32; 726/22; 726/23; 726/26; 726/27; 713/187

(58) Field of Classification Search
USPC .......................................................... 726/32
See application file for complete search history.

(56) References Cited

U.S. PATENT DOCUMENTS

| 6,633,877 | B1 | 10/2003 | Saigh et al. |
| 7,698,545 | B1* | 4/2010 | Campbell et al. ................. 713/1 |
| 7,757,097 | B2* | 7/2010 | Atallah et al. ................. 713/187 |
| 7,917,617 | B1* | 3/2011 | Ponnapur et al. ............. 709/224 |
| 7,941,470 | B2 | 5/2011 | Le et al. |
| 8,191,158 | B2 | 5/2012 | Ginter et al. |
| 8,566,941 | B2* | 10/2013 | Suit et al. ......................... 726/23 |
| 8,572,605 | B1 | 10/2013 | Tene et al. |
| 2006/0031686 | A1* | 2/2006 | Atallah et al. ................. 713/190 |
| 2007/0073882 | A1* | 3/2007 | Brown et al. ................. 709/226 |
| 2007/0074208 | A1* | 3/2007 | Ling et al. ......................... 718/1 |
| 2008/0209557 | A1 | 8/2008 | Herley et al. |
| 2008/0244028 | A1* | 10/2008 | Le et al. ........................ 709/208 |
| 2008/0263658 | A1* | 10/2008 | Michael et al. ................. 726/22 |
| 2009/0064136 | A1* | 3/2009 | Dow et al. ......................... 718/1 |
| 2009/0182928 | A1* | 7/2009 | Becker et al. ..................... 711/6 |
| 2009/0183173 | A1* | 7/2009 | Becker et al. ................. 719/313 |
| 2010/0037066 | A1 | 2/2010 | Miyabe |

(Continued)

OTHER PUBLICATIONS

Van Der Leest et al., Security Architectures, Protocol Design and Evaluation Principles for Anti-Counterfeiting/Anti-Tampering Solutions, UNIQUE, Foundations for Forgery-Resistant Security Hardware, Jan. 9, 2009.

(Continued)

*Primary Examiner* — Kambiz Zand
*Assistant Examiner* — Yonas Bayou
(74) *Attorney, Agent, or Firm* — Ryan, Mason & Lewis, LLP

(57) ABSTRACT

Techniques for detecting a cloned virtual machine instance. A method includes transmitting an identifier associated a virtual machine from an agent embedded in the virtual machine akin to a malware to a detection entity in a network, determining whether the identifier is a unique identifier or whether the identifier is a clone of an identifier associated with a separate virtual machine in the network, and initiating at least one remedial action with the agent embedded in the virtual machine if the identifier is determined to be a clone of an identifier associated with a separate virtual machine in the network.

16 Claims, 2 Drawing Sheets

(56) References Cited

U.S. PATENT DOCUMENTS

| | | |
|---|---|---|
| 2010/0122248 A1* | 5/2010 | Robinson et al. .............. 718/1 |
| 2010/0169881 A1 | 7/2010 | Silvera et al. |
| 2010/0257523 A1 | 10/2010 | Frank |
| 2012/0054486 A1 | 3/2012 | Lakkavalli et al. |
| 2012/0110274 A1 | 5/2012 | Rosales et al. |
| 2012/0110574 A1 | 5/2012 | Kumar |
| 2013/0219041 A1 | 8/2013 | Gardner |
| 2013/0227699 A1 | 8/2013 | Barak et al. |
| 2013/0254833 A1 | 9/2013 | Nicodemus et al. |

OTHER PUBLICATIONS

Yu et al., Security Challenges on the Clone, Snapshot, Migration and Rollback of Xen Based Computing Environments, ChinaGrid Conference (ChinaGrid), 2010 Fifth Annual.

Botnet, http://en.wikipedia.org/wiki/Botnet downloaded Nov. 9, 2012, pp. 1-13.

* cited by examiner

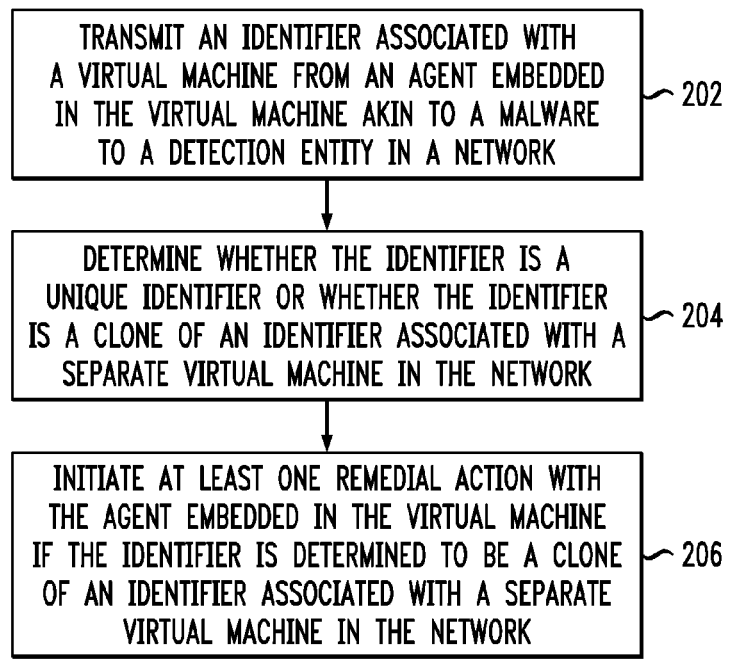
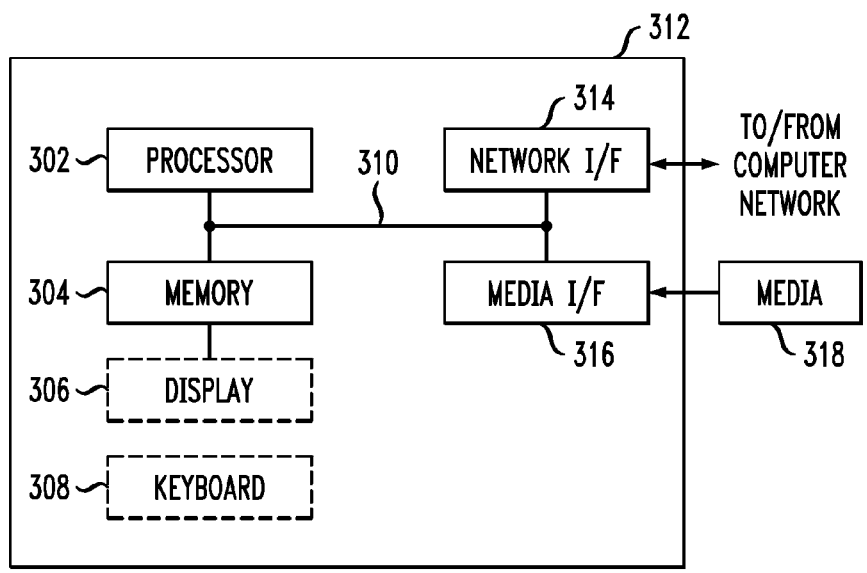

LIMITING INFORMATION LEAKAGE AND PIRACY DUE TO VIRTUAL MACHINE CLONING

FIELD OF THE INVENTION

Embodiments of the invention generally relate to information technology, and, more particularly, to virtual machine (VM) management.

BACKGROUND

Virtual machines (VMs) running in a cloud can be cloned or copied. By way of example, the cloning may be performed by a system administrator, the cloning may be accidentally performed by a customer or user of VMs, or the cloning may be performed maliciously by an attacker. A customer or user will often aim to protect its VMs against any unauthorized VM cloning because such cloning can result in information leakage, or even privacy and/or confidentiality breaches. Consequently, a need exists to limit information leakage as a result of unauthorized VM cloning.

SUMMARY

In one aspect of the present invention, techniques for limiting information leakage and piracy due to virtual machine cloning are provided. An exemplary computer-implemented method for detecting a cloned virtual machine instance can include steps of transmitting an identifier associated a virtual machine from an agent embedded in the virtual machine akin to a malware to a detection entity in a network, determining whether the identifier is a unique identifier or whether the identifier is a clone of an identifier associated with a separate virtual machine in the network, and initiating at least one remedial action with the agent embedded in the virtual machine if the identifier is determined to be a clone of an identifier associated with a separate virtual machine in the network. As described herein in accordance with at least one embodiment of the invention, the agent in a virtual machine is run akin a malware, making its detection difficult by an entity attempting an unauthorized cloning of VM images.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating techniques for detecting a cloned virtual machine instance, according to an embodiment of the invention; and FIG. 3 is a system diagram of an exemplary computer system on which at least one embodiment of the invention can be implemented.

DETAILED DESCRIPTION

Figure 1:
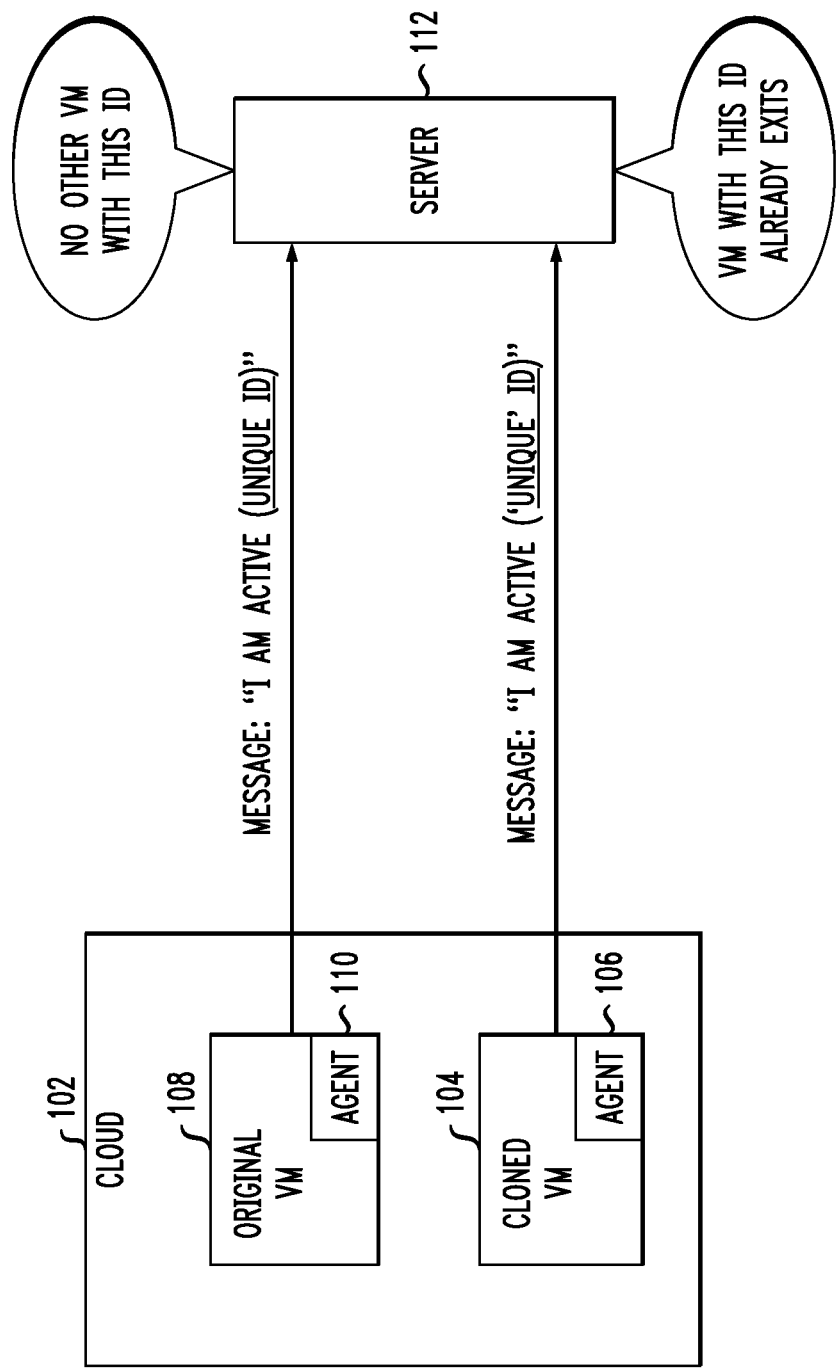
FIG. 1 is a block diagram illustrating an example embodiment, according to an aspect of the invention.

As described herein, an aspect of the present invention includes protecting information leakage and piracy due to virtual machine (VM) cloning, and VMs being re-instantiated in an unauthorized manner. At least one embodiment of the invention includes detecting, using malware-type agents which are difficult to detect, whether a VM is genuine or is a copy or cloned VM, as well as de-activating an instance of a cloned VM via the malware-type agent upon detection.

At least one embodiment of the invention can be implemented in a context such as the following example scenario. A customer or a third-party runs a server which keeps tracks of unique VMs. A VM running in a cloud runs an agent (on the VM) which periodically or randomly reports a unique identifier to the server. As such, in order to evade detection by a separate user or entity that wishes to clone VMs without the permission of the customer, an aspect of the invention includes running the agent in a similar fashion to a malware (for example, attached to a dynamic-link library (DLL), being invoked randomly upon a system call invocation, etc.). If the network access is blocked, the agent running can disrupt the working of a cloned VM.

Accordingly, as further described in connection with FIG. 1, a malware-like agent can be embedded as security protection into all VMs in a network. As such, at least one embodiment of the invention can include utilizing malware techniques when virtual machines images are first readied or virtual machines are first instantiated. The malware-type agents are typically installed by the creator of the first virtual machine instance or image. The malware-type agent takes active action against tampering (for example, by checking hash of its executable at random points during its execution). Each agent generates a unique identifier (ID) associated with its host VM, and periodically (for example, at random or pre-specified intervals), each agent sends said ID to the customer's server which ensures that no other VM with the same said ID is concurrently running.

As additionally detailed herein, the agents can query a central server or form a peer-to-peer network to query an identifier.

By way of example, an agent can query a central server and/or peer-to-peer network to determine if any entity therein has a copy of a similar ID. Accordingly, if an agent is running on a cloned VM, and if a copy of the relevant ID is located/determined, remedial action will be taken. By way of example, in at least one embodiment of the invention, the agent on the cloned VM will self-destruct its host VM.

FIG. 1 is a block diagram illustrating an example embodiment, according to an aspect of the invention. By way of illustration, FIG. 1 depicts a cloud environment 102, which includes an original VM 108 with a corresponding agent component 110 and a cloned VM 104 with a corresponding agent component 106. As noted herein, the agent components 110 and 106 are run like or akin to malware. FIG. 1 additionally depicts a server 112, which can include a central server and/or a peer-to-peer network, as detailed herein.

As also illustrated in FIG. 1, if agent 110 identifies itself (via a unique ID associated with host VM 108) to the server 112, the server 112 determines and/or acknowledges that there are no other concurrently running VMs with this particular ID. However, if agent 106 identifies itself (via the ID associated with cloned VM 104) to the server 112, the server 112 determines and/or acknowledges that a VM with this ID (namely, VM 108) already exists and/or is concurrently running, and accordingly, the server 112 generates and alarm and/or initiate one or more remedial actions. For example, the server 112 can have/maintain an authenticated list of IDs that can be utilized for this determination and/or comparison.

In an example embodiment of the invention, a system administrator of the cloud 102 can terminate an agent of a cloned VM 104 upon detection. Alternatively, the system administrator of the cloud 102 can block the network with respect to the cloned VM 104 upon detection.

Also, at least one embodiment of the invention can be implemented with a peer-to-peer network. In such a context, an agent can search for other VMs on the same subnet and use those VMs as relays. By way of illustration, consider that the agent on the unauthorized VM wants to communicate with the server; however, the administrator of the VM may have disabled communication with that server directly from this VM. Therefore, the VM would attempt to discover a network path using other VMs or servers. One method to potentially accomplish this is to develop a peer-to-peer network via various VMs in the same and/or different networks in which the first VM resides. Consider, for example, three VMs: V1, V2, and V3. V1 is unauthorized. V2 and V3 are connected to V1. V1 tries to communicate with V2 and V3 so that it (that is, V1) can authorize itself with the server. Either V2 or V3, based on the peer-to-peer protocol, would forward its packets to the server.

In another method, V2 or V3 would determine whether V1 is authorized or not; V2 and V3 would act as the authorization points and send the information to the server if they need to or have access to do so.

In connection with a peer-to-peer network context, at least one embodiment of the invention can include community detection. In a system that is not controlled by an attacker (that is, an intending cloner), for example, the server 112 can be replaced one or more VMs (detecting peers). Accordingly, a peer-to-peer network is formed and/or utilized to identify a malicious/intending cloner and inform that VM (that is, the VM cloned by the cloner) to self-destruct.

Additionally, in at least one embodiment of the invention, a peer-to-peer network can exist in conjunction with a central server (such as server 112), and a cloned VM (for example, VM 104), upon detection, is blocked from communicating with its agent (for example, agent 106), but the peer-to-peer network is probed and another VM is identified with whom the agent can communicate. To guard against tampering of malware-type agents, the probing agent may contact several agents and take a majority vote. For example, a conservative configuration for a malware-type agent will self-destruct a VM if it cannot contact a central server.

Also, in at least one embodiment of the invention, once it is suspected that there is at least one unauthorized cloned VM, the server and/or detecting peer queries the suspected VM to prove its unique identity. If the suspected VM ultimately proves to in fact be a cloned VM, the system administrator of the cloud can terminate the agent of the cloned VM or the system administrator can block the network with respect to that agent and VM (as detailed above). In a peer-to-peer network context, the agent of the cloned VM can, as noted above, search for other VMs on the same subnet and use the other VMs as relays. Additionally, the agent of the cloned VM can self-destruct its host VM.

In accordance with at least one embodiment of the invention, an agent is created when a VM (that is, the agent's host VM) is cloned, and the agent is active after each instantiation of the virtual machine image. The agent records all actions/operations by/on the VM until it is determined that the host VM is a clone. As described herein, such a determination can be made based upon utilization of the unique ID associated with each VM. Upon this determination, the agent destroys all of the records of logs to remove the trace of its existence.

The agent stops running and/or self-destructs its host VM as soon as it contacts the server and/or detecting peer VM in a peer-to-peer network and verifies that a VM instance is a clone. The agent may also self-destruct a VM or take any other remedial action if it (that is, the agent) is unable to reach the server and/or detecting peer VMs. In at least one embodiment of the invention, the agent additionally sends all logs and configuration information to the server and/or detecting peer VM. The frequency of attempting to contact the server or the peer-to-peer network (for the agent) can be generated by a pseudo-random process, and the frequency can change as the processing stage of an agent evolves.

Accordingly, agent processing stages can include the following. Initially, the agent runs on a host VM in user-land (as a non-kernel process). If the agent cannot contact the server and/or detecting peer VM in a peer-to-peer network, the agent runs in an operating system (OS) layer. Alternatively, if the agent cannot contact the server and/or detecting peer VM, the agent runs in privileged mode. Further, in at least one embodiment of the invention, if the agent cannot contact the server and/or detecting peer VM, the agent locks down the VM (for example, by invoking the screen save lock feature) and/or destroys it (that is, self-destructs).

Once the VM is unlocked (for example, by a key or via action by the system administrator), the agent wakes up/re-activates and sends the logs and configuration information to the server. Accordingly, the server may act as a command-control center with the agent as a bot.

As detailed herein, an aspect of the invention includes initiating and/or executing one or more remedial actions. Such remedial actions can include, for example, self-destruction of an agent or host VM, or automatic or manual shutdown of a VM. Further, remedial actions can also include providing a notification (for example, via email) from a central server to a system administrator of the provider to block or black-list a particular user. Additionally, a notification (for example, via email) can be provided from the (malware) agent to a user to block or avoid a particular user or VM.

FIG. 2 is a flow diagram illustrating techniques for detecting a cloned virtual machine instance, according to an embodiment of the present invention. Step 202 includes transmitting an identifier associated a virtual machine from an agent embedded in the virtual machine akin to a malware to a detection entity in a network. The transmitting can be done, for example, at a random frequency, at a pre-specified interval, and/or at a frequency that corresponds to mode of the agent. As detailed herein, the agent utilizes at least one malware technique.

Step 204 includes determining whether the identifier is a unique identifier or whether the identifier is a clone of an identifier associated with a separate virtual machine in the network. The determining step can include utilizing an authenticated list of identifiers for comparison with the transmitted identifier. Also, as described herein, the detection entity can include a central server or one or more detecting peer virtual machines in a peer-to-peer network.

Step 206 includes initiating at least one remedial action with the agent embedded in the virtual machine if the identifier is determined to be a clone of an identifier associated with a separate virtual machine in the network. Remedial actions can include self-destruction of by the agent, as well as automatic or manual shutdown of the virtual machine associated with the cloned identifier (for example by wiping out the virtual machine disk) if the agent cannot reach the network within a pre-determined amount of time. Further, in at least one embodiment of the invention, remedial actions can additionally include providing a notification to a system administrator of a provider or original owner of virtual machine to block the virtual machine associated with the cloned identifier, and/or providing a notification to a user to block the virtual machine associated with the cloned identifier.

The techniques depicted in FIG. 2 can additionally include embedding an agent into each virtual machine in the network, as well as generating a unique identifier for each virtual machine in the network.

Additionally, in at least one embodiment of the invention, the detection entity includes a central server and/or a peer-to-peer network. Such an embodiment can also include blocking the virtual machine associated with the cloned identifier from communicating with its agent, and probing the peer-to-peer network to identify another virtual machine in the network with whom the agent can communicate.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, establishing channels of communication from an untrusted environment to a trusted server/peer and communicating with the trusted server/peer to establish its genuineness.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a cloned virtual machine instance, the method comprising:
    generating a unique identifier for each virtual machine in a network;
    transmitting an identifier associated with a given virtual machine from an agent embedded in the virtual machine akin to a malware to a detection entity in the network;
    determining whether the identifier is one of the generated unique identifiers or whether the identifier is a clone of an identifier associated with a separate virtual machine in the network; and
    initiating at least one remedial action with the agent embedded in the virtual machine if the identifier is determined to be a clone of an identifier associated with a separate virtual machine in the network;
    wherein at least one of said generating, said transmitting, said determining and said initiating is carried out by a computer device.

2. The method of claim 1, wherein said transmitting comprises transmitting at a random frequency.

3. The method of claim 1, wherein said transmitting comprises transmitting at a pre-specified interval.

4. The method of claim 1, wherein said transmitting comprises transmitting at a frequency that corresponds to mode of the agent.

5. The method of claim 1, wherein said determining comprises utilizing an authenticated list of identifiers for comparison with the transmitted identifier.

6. The method of claim 1, further comprising:
    embedding an agent into each virtual machine in the network.

7. The method of claim 1, wherein the agent utilizes at least one malware technique, wherein said at least one malware technique comprises at least one of dynamic-link library linkage, random invocation upon a system, and/or a program call invocation.

8. The method of claim 1, wherein the detection entity comprises a central server.

9. The method of claim 1, wherein the detection entity comprises one or more detecting peer virtual machines in a peer-to-peer network.

10. The method of claim 1, wherein the detection entity comprises one or more central servers and one or more peer-to-peer virtual machines.

11. The method of claim 1, wherein the at least one remedial action comprises the agent blocking all network connections and implementing self-destruction of the virtual machine if the agent cannot reach the network within a predetermined amount of time.

12. The method of claim 1, wherein the at least one remedial action comprises self-destruction of by the agent by wiping out the virtual machine disk.

13. The method of claim 1, wherein the at least one remedial action comprises automatic or manual shutdown of the virtual machine associated with the cloned identifier.

14. The method of claim 1, wherein the at least one remedial action comprises providing a notification to a system administrator of a provider to block the virtual machine associated with the cloned identifier.

15. The method of claim 1, wherein the at least one remedial action comprises providing a notification to a user to block the virtual machine associated with the cloned identifier.

16. The method of claim 1, wherein the detection entity comprises a central server and a peer-to-peer network.

* * * * *